United States Patent Office 3,772,276
Patented Nov. 13, 1973

---

3,772,276
as-TRIAZINES
Fritz Sauter, Vienna, Austria, assignor to Centre d'Etudes pour l'Industrie Pharmaceutique, Toulouse, France
No Drawing. Filed Jan. 28, 1972, Ser. No. 221,805
Claims priority, application Austria, Feb. 3, 1971,
A 902/71
Int. Cl. C07d 55/10
U.S. Cl. 260—248 AS                  2 Claims

ABSTRACT OF THE DISCLOSURE

The invention relates to triazine derivatives having the formula:

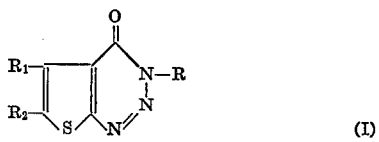

in which R represents hydrogen, a lower alkyl, benzyl or phenacyl radical, $R_1$ represents hydrogen or a lower alkyl radical and $R_2$ represents a lower alkyl radical or, only in the case where $R_1$ is a hydrogen atom, also a hydrogen atom, or $R_1$ and $R_2$ represent together an alkylene bridge —$(CH_2)_n$— in which $n$ is an integer.

Said derivatives are therapeutically useful in view of their sedative, antalgic, anti-inflammatory, anti-tussive and diuretic properties.

---

This invention relates to new triazine derivatives, to a process for their preparation and to the applications thereof, particularly in human and veterinary therapeutics.

The new compounds of this invention have the following general formula:

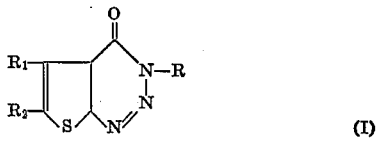

in which R represents hydrogen, a lower alkyl, benzyl or phenacyl (—$CH_2$—$CO$—$C_6H_5$) radical, $R_1$ represents hydrogen or a lower alkyl radical and $R_2$ represents a lower alkyl radical, or, only in the case where $R_1$ is a hydrogen atom, also a hydrogen atom, or $R_1$ and $R_2$ represent together an alkylene bridge —$(CH_2)_n$— in which $n$ is an integer.

The lower alkyl radicals of R, $R_1$ and $R_2$ are typically radicals having from 1 to 6 carbon atoms, particularly from 1 to 4 carbon atoms, such as methyl and ethyl, and the alkylene bridge —$(CH_2)_n$— is typically a tetramethylene bridge —$(CH_2)_4$—.

The invention relates also to a process for the preparation of compounds of the Formula I, comprising diazotising 2-aminothiophene-3-carboxylic acid amide derivatives having the formula:

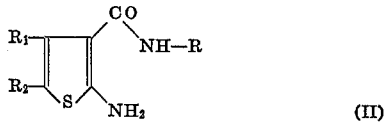

in which R, $R_1$ and $R_2$ are as defined above.

The compounds of the Formula II are prepared according to the methods of K. Gewald (Chem. Ber., 98, 1965, 3571) and K. Gewald, E. Schinke and H. Bottcher (Chem. Ber., 99, 1966; 94).

Diazotation, which is accompanied by a cyclisation, is carried out in conventional manner with sodium nitrite, in the presence of a strong acid.

The reaction is carried out at about 0° C. and the acid used is advantageously concentrated hydrochloric or sulfuric acid.

The diazotation may also be effected in conventional manner, by means of nitrosylsulfuric acid in sulfuric acid.

According to another embodiment, to prepare derivatives of the Formula I in which R is a lower alkyl, benzyl or phenacyl radical, the corresponding derivatives of Formula I in which R is hydrogen are first prepared and are then reacted with a suitable alkylating or aralkylating agent.

The following non-limiting examples are given to illustrate the preparation of the compounds according to the invention.

EXAMPLE 1

Preparation of 4-oxo-3,4-dihydro-thieno-(2,3-d)triazine (derivative 1)

2-amino-thiophene-3-carboxylic acid amide (K. Gewald, Chem. Ber., 1965, 98, 3571) (2.8 g.) is dissolved, at a temperature of 5° C., in concentrated $H_2SO_4$ (100 ml.). A solution of $NaNO_2$ (1.4 g.) in concentrated $H_2SO_4$ (50 ml.) is then added dropwise, with stirring, over 5 minutes, at a temperature from —5° C. to 0° C. The mixture is stirred at this temperature for a further hour, after which it is left aside during 2 hours at room temperature and is finally heated during 1 hour over a water-bath.

The cooled solution is extracted with ether, and the ethereal liquor is repeatedly extracted with a 0.25 N NaOH solution.

The alkaline solutions are made acidic and are then re-extracted with ether. After drying, the ether is distilled off and the material is recrystallized from methanol, to give 1.6 g. of small colorless crystals having a melting point (Koefler block) of 180° C. (after transformation into needles at 150° C.).

EXAMPLE 2

Preparation of 6-methyl-4-oxo-3,4-dihydro-thieno-(2,3-d)-(1,2,3)-triazine (derivative 2)

A solution of $NaNO_2$ (7 g.) in water (40 ml.) is added dropwise, at a temperature of 0° C., over 15 minutes and with stirring to 2-amino-5-methyl-thiophene-3-carboxylic acid amide (15.6 g.) dissolved in 3 N HCl (300 ml.).

The mixture is stirred during a further hour at room temperature and is then left aside 3 days at room temperature.

A red precipitate is formed and is then dissolved in a NaOH solution.

Filtration and acidification with hydrochloric acid produce a reddish precipitate which, on recrystallization from ethanol, in the presence of activated charcoal, gives 14.6 g. of slightly brown-yellow needles which decompose without melting from a temperature of 182° C.

EXAMPLE 3

Preparation of 5,6-dimethyl-4-oxo-3,4-dihydrothieno-(2,3-d)(1,2,3)triazine (derivative 3)

A solution of 2-amino-4,5-dimethyl-thiophene-3-carboxylic acid amide (0.1 mole) in 3 N HCl (300 ml.) is added dropwise, at 0° C., within 15 minutes, to a solution of $NaNO_2$ (7 g.) in water (40 ml.), while taking care to maintain the temperature at about 0° C. Stirring is continued for a further hour, after which the mixture is left aside at room temperature. Filtration gives a reddish material which is washed, dried and redissolved in a NaOH solution. The material is then reprecipitated and repeatedly recrystallized from ethanol in the presence of active charcoal, to give reddish needles which decompose slowly from a temperature of 190° C.

EXAMPLE 4

Preparation of 4-oxo-3,4,5,6,7,8-hexahydro-(1)-benzothieno(2,3-d)(1,2,3)triazine (derivative 4)

A solution of $NaNO_2$ (7 g.) in water (40 ml.) is added dropwise, over 15 minutes, to a solution (cooled to 0° C.) of 2-amino-4,5,6,7-tetrahydrobenzo (b)-thiophene-3-carboxylic acid amide (0.1 mole) in 3 N HCl (300 ml.), while taking care to maintain the temperature at about 0° C.

Stirring is continued during a further hour, after which the mixture is left aside at room temperature. Filtration gives a reddish material which is then washed, dried and redissolved in a NaOH solution. The material is reprecipitated and repeatedly recrystallized from ethanol in the presence of active charcoal, to give reddish needles which decompose at 180° C.

EXAMPLE 5

Preparation of 3-methyl-4-oxo-3,4,5,6,7,8-hexahydro-(1) benzothieno (2,3-d) (1,2,3) triazine (derivative 5)

To a solution of 2-amino-4,5,6,7-tetrahydrobenzo-(b)-thiophene-3-carboxylic acid methylamide (4.2 g.) in 3 N HCl (100 ml.) is added dropwise, over 5 minutes, a solution of sodium nitrite (1.4 g.) in water (20 ml.), while maintaining the temperature at about 0° C. Stirring is continued at the same temperature during one hour, after which the mixture is allowed to rest during 18 hours, at room temperature. Filtration of the material followed by recrystallization from ethanol, in the presence of activated charcoal, give 4.2 g. of colorless needles having a melting point (Koefler block) of 118° C.

Preparation of the starting material, 2-amino-4,5,6,7-tetrahydrobenzo(b)-thiophene - 3 - carboxylic acid methylamide N-methyl-cyanoacetamide (30 g.), cyclohexanone (30 g.) and sulfur (10 g.) are stirred, during 3 hours, in a mixture of morpholine (30 ml.) and ethanol (60 ml.), at a temperature of 50–60° C.

A precipitate is formed on cooling. It is collected by filtration, washed with ethanol and then dried. A second fraction of product may be recovered by adding water to the filtrate; a precipitate is formed and is then collected, washed with ethanol and dried.

Yellow crystals of 2-amino-4,5,6,7-tetrahydro(b)-thiophene-3-carboxylic acid methylamide are obtained in a total yield of 14.1 g.; their melting point, determined with the Koefler block, is 192° C.

EXAMPLE 6

Preparation of 3-methyl-4-oxo-3,4,5,6,7,8-hexahydro-(1)-benzothieno(2,3-d)(1,2,3)triazine (derivative 6)

To a solution of 4-oxo-3,4,5,6,7,8-hexahydro-(1)-benzothieno(2,3-d)(1,2,3)-triazine (derivative 4) in NaOH (250 ml.) are added 5 ml. of dimethyl sulfate.

The mixture, under constant stirring, is left aside during 5 minutes at room temperature and is then heated at 50° C. during 10 minutes.

Filtration of the cooled solution gives a brown precipitate which, on recrystallization from ethanol in the presence of activated charcoal, produces slightly yellowish needles having a melting point (Koefler block) of 118–119° C.

EXAMPLE 7

Preparation of 3-phenacyl-4-oxo-3,4,5,6,7,8-hexahydro-(1)benzothieno (2,3-d) (1,2,3) triazine (derivative 7)

A solution containing 4-oxo-3,4,5,6,7,8-hexahydro-(1)benzothieno(2,3-d) (1,2,3) triazine (derivative 4) (2.0 g.) in ethanol (50 ml.) and a 10% sodium methoxide solution in ethanol (2.3 ml.) is added to a solution of phenacyl bromide (2.0 g.) in ethanol (20 ml.).

The mixture is briefly boiled, after which it is cooled and poured over water.

The resulting precipitate is washed with N NaOH and then with water, and is then dried. Recrystallization from ethanol, in the presence of activated charcoal, gives slightly yellowish platelets having a melting point (Koefler block) of 172–173° C.

The results of toxicological, pharmacological and clinical tests reported hereinbelow evidence the useful activities of the derivatives of this invention, particularly the sedative, antalgic, anti-inflammatory, antitussive and diuretic activities which make them therapeutically valuable.

Thus, the invention relates also to a therapeutic composition having in particular sedative, antalgic, anti-inflammatory, antitussive and diuretic actions, comprising a derivative of the Formula I together with a pharmaceutically acceptable carrier.

(I) Toxicological investigation

This investigation demonstrates the low toxicity of the derivatives of this invention together with their good tolerance.

For indicative purposes, the $LD_{50}/24$ hrs., determined according to the method by Miller and Tainter in mice, by the intraperitoneal route and by kilogram of body weight, are of 460 mg. for derivative 1, 410 mg. for derivative 2, 220 mg. for derivative 3, 225 mg. for derivative 4, 400 mg. for derivative 5 and 350 mg. for derivative 6.

(II) Pharmacological investigation (1) *Sedative action.*—From this investigation, it is apparent that the derivatives of this invention, administered orally to rats at a dosage of 30 mg./kg., produce a marked sedative effect. Thus, for example, in the barbiturates potentiation test, derivative 4 causes 90% of the test animals to fall asleep and derivative 5, administered at the time of awakening after chloral hydrate-induced sleep, causes the animals to fall asleep again for an extended period of time.

(2) *Antalgic action.*—In the chemical stimulation test by intraperitoneal injection of acetic acid (Koester-Anderson-De Beer Feder, Proceedings 18 and Supp. Pharmacology, 1959, 412–426), derivatives 1, 2, 3 and 4, on oral administration at a dosage of 150 mg./kg. produce antalgic percentages of 62%, 58%, 74% and 71%, respectively.

(3) *Anti-inflammatory action.*—The derivatives of this invention are endowed with a marked anti-inflammatory activity. The test of the localised oedema produced in rat by injection of carrhagenin in the metatarsal flexor muscles of the right rear paw has shown that the animal was efficiently protected by oral administration of 30 mg./kg. The percent anti-inflammatory activity thus determined 3 hours after injection of the phlogogenic agent is 30% for derivative 1, 58% for derivative 2, 56% for derivative 3, 48% for derivative 4, 44% for derivative 5 and 51% for derivative 6.

(4) *Anti-tussive action.*—Investigation of the activity of the derivatives of this invention with respect to ammonia aerosol (Salle-Brunaud technique, Arch. Int. Pharmacodyne, 1–2, 120–126, 1960) made it possible to determine that in guinea-pig, oral administration of 30 mg./kg. produces a substantial decrease of the coughing motions caused by the cough-producing agent, percent relief being 63% for derivative 1, 56% for derivative 2, 62% for derivative 3, 57% for derivative 4, 53% for derivative 5 and 48% for derivative 6.

(5) *Diuretic action.*—On oral administration to rats, at a dosage of 30 mg./kg., the derivatives of this invention were found highly diuretic and natriuretic, without any evidence of potassium loss.

The results of this investigation show that the compounds forming the active ingredient of the therapeutic composition of the invention possess sedative, anti-inflammatory, antitussive and diuretic activities.

The composition may advantageously be formulated for therapeutic use in the form of an injectable solution. It may also be formulated for oral administration in the form of tablets, coated tablets, capsules and syrups, and for rectal administration in the form of suppositories.

Each unit dose may advantageously contain from 0.050 g. to 0.500 g. of active ingredient, the dosages administrable per 24 hours varying within a range from 0.050 g. to 1.50 g.

Non-limiting examples of pharmaceutical formulations of the composition according to the invention are given below.

EXAMPLE 8

Injectable solution

| | |
|---|---|
| Derivative 3 g | 0.150 |
| Isotonic solvent ml | 2 |

EXAMPLE 9

Tablets

| | G. |
|---|---|
| Derivative 4 | 0.250 |
| Talc | 0.005 |
| Glucose | 0.010 |
| Levulose | 0.010 |

EXAMPLE 10

Coated tablets

| | G. |
|---|---|
| Core: | |
| Derivative 1 | 0.200 |
| Magnesium stearate | 0.010 |
| Starch | 0.005 |
| Glucose | 0.005 |
| Coating: | |
| Shellac | 0.002 |
| Gum arabic | 0.005 |
| Magnesium stearate | 0.010 |
| Titanium dioxide | Traces |
| Wax | Traces |
| Lactose, q.s. to make 1 coated tablet. | |

EXAMPLE 11

Capsules

| | G. |
|---|---|
| Derivative 2 | 0.300 |
| Talc | 0.020 |

EXAMPLE 12

Suppositories

| | G. |
|---|---|
| Derivative 6 | 0.150 |
| Semi-synthetic triglycerides, q.s. to make 1 suppository. | |

EXAMPLE 13

Syrup

| | G. |
|---|---|
| Derivative 5 | 3 |
| Excipient, q.s. to make 100 ml. | |

(III) Clinical investigation

This investigation evidenced the therapeutic efficiency of the composition according to the invention.

As sedative, it produces, in nervous subjects, a feeling of peace and relaxation accompanied by muscle relaxation. Due to its anti-inflammatory and antalgic properties, it combats efficiently all painful inflammatory phenomena.

Due to its anti-tussive action, it produces a rapid relief or decrease of coughing, whatever its origin.

In addition, it is active on diuresis by producing rapid substantial liquid depletions while respecting kaliemia.

A few clinical reports on the composition of this invention are given below for illustrative purposes.

CASE REPORT NO. 1

Mrs. Jacqueline C . . . , aged 28, consults because of an asthenic-depressive condition following family conflicts. She complains of headaches, insomnia, accompanied by disorders in her disposition and by emotional lability (frequent crying fits) which compelled her to stop working.

She was prescribed a treatment with the therapeutic composition of Example 9, at a rate of 2 tablets per day, during 3 weeks.

After one week of treatment, there is substantial improvement of the behavior. In addition, the headaches have disappeared and the sleep has reverted almost to normal.

At the end of the treatment, recovery is complete and the patient may resume her active life.

Results and tolerance are excellent.

CASE REPORT NO. 2

Mr. Michel F . . . , aged 20, consults for fits of coughing which appeared after a cold. Said fits are moderately strong, but very frequent (5–6 per hour), both diurnal and nocturnal. There are moderate mocupurulent expectoration, diffuse rhonchus and sibilant rales on the right side. On X-ray examination, the parenchyma is normal. A tracheobronchitis is diagnosed.

The patient is prescribed the therapeutic composition of Example 13, at a daily rate of 3 tablespoonfuls.

Nocturnal coughing fits are found to disappear as early as the second day. The action on the frequency of the fits is quite dramatic, the frequency of such fits decreasing from 5–6 per hour to one every other hour.

On the fifth day, auscultation is normal and recovery is complete.

Results and tolerance are excellent.

CASE REPORT NO. 3

Mr. Louis T. . . . , aged 65, is a great smoker (30 cigarettes per day). He complains of a tracheal irritating cough producing diurnal and nocturnal fits.

He is administered 2 suppositories daily of the therapeutic composition of Example 12.

Relief of the nocturnal fits is obtained within 2 days. Total relief is obtained after the 6th day.

Results and tolerance are excellent.

CASE REPORT NO. 4

Miss Françoise G. . . . , aged 19, consults for slight rhinorrhea and nasal obstruction accompanied by frontal headaches.

She is prescribed 3 coated tablets per day of the therapeutic composition of Example 10, during one week.

Action on naso-sinus decongestion is very rapid.

The headaches disappear on the 2nd day of treatment and clinical recovery is complete within 5 days.

Results and tolerance are excellent.

CASE REPORT NO. 5

Mr. Jean M. . . . , aged 32, consults for lumbar pains. The patient suffers from violent lumbar pain which began after an unusual effort, and from an impossibility to walk.

He is prescribed the therapeutic composition of Example 11, at a daily rate of 3 capsules per day.

As early as the first dose, the pains are less violent. After three days of treatment, the patient suffers no longer and is able to get up.

Results and tolerance are excellent.

CASE REPORT NO. 5

Mr. Auguste B. . . . , aged 35, consults for a sprained right ankle, sprained at least one month previously. The pains and the hematoma disappeared 8 days prior to consultation, but the pains reappeared suddenly, with limited motions corresponding unduobtedly to a gradual sclerosis of the ligamental and capsular injuries.

The patient is prescribed a daily injection of the therapeutic composition of Example 8, during 10 days.

Rapid and gradual improvement is found to occur in the patient, and this is all the more noteworthy that immobilization is not employed and that the patient is allowed to walk.

Complete recovery is obtained by the end of the treatment.

Results and tolerance are excellent.

This investigation made is possible to determine that the derivatives of this invention produce excellent therapeutical results and that, in addition, they benefit from excellent biological and clinical tolerance. They are applicable in all inflammatory and painful conditions, in conditions in which a sedative treatment of nervous erethism is indicated, in diseases of the respiratory tract which generate acute or chronic coughing, and in cardiologic, obstetric and endocrinologic conditions in view of their diuretic activity.

Having now described my invention what I claim as new and desire to secure by Letters Patent is:

1. A compound of the formula:

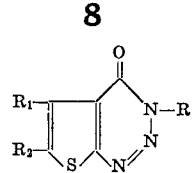
(I)

in which R is selected from the group consisting of hydrogen and the lower alkyl radicals, the benzyl radical and the phenacyl radical, $R_1$ considered alone is selected from hydrogen and the lower alkyl radicals, $R_2$ considered alone is selected from the lower alkyl radicals and hydrogen only when $R_1$ is hydrogen, and $R_1$ and $R_2$ considered together form a —$(CH_2)_4$— radical.

2. A compound as claimed in claim 1, wherein R, $R_1$ and $R_2$ are selected from the group consisting of the methyl and ethyl groups.

References Cited
UNITED STATES PATENTS 3,014,906   12/1961   Gadekar et al. _____ 260—248 X JOHN M. FORD, Primary Examiner U.S. Cl. X.R.

424—249